(12) United States Patent
Sitrick et al.

(10) Patent No.: US 6,508,706 B2
(45) Date of Patent: Jan. 21, 2003

(54) ELECTRONIC INTERACTIVE GAMING APPARATUS, SYSTEM AND METHODOLOGY

(76) Inventors: David Howard Sitrick, 820 Burchell, Highland Park, IL (US) 60035; Thomas Arthur Freeburg, 416 N. Belmont Ave., Arlington Heights, IL (US) 60004

( * ) Notice: Subject to any disclaimer, the term of this patent is extended or adjusted under 35 U.S.C. 154(b) by 6 days.

(21) Appl. No.: 09/886,917

(22) Filed: Jun. 21, 2001

(65) Prior Publication Data

US 2002/0198032 A1 Dec. 26, 2002

(51) Int. Cl.[7] .............................................. A63E 13/00
(52) U.S. Cl. ............................................ 463/1; 463/43
(58) Field of Search ......................... 463/1, 7, 9, 43, 463/44; 273/250–255, 266

(56) References Cited

U.S. PATENT DOCUMENTS

| | | | | |
|---|---|---|---|---|
| 5,854,923 A | * | 12/1998 | Dockter et al. | ............. 395/605 |
| 5,938,726 A | * | 8/1999 | Reber et al. | ................. 709/217 |
| 6,292,780 B1 | * | 9/2001 | Doederlein et al. | ......... 704/270 |
| 6,322,077 B1 | * | 11/2001 | Braunlich et al. | .......... 273/292 |

* cited by examiner

*Primary Examiner*—Denise L. Esquivel
*Assistant Examiner*—Melvin Jones
(74) *Attorney, Agent, or Firm*—Sitrick & Sitrick

(57) ABSTRACT

It is a method of communicating amongst a network of networked computing entities to provide feedback to a user representative of a group social behavior comprising and providing a uniform data structure for each said computing entity which defines group social behavior simulation and the data structure comprising interaction rules and initial conditions. The interaction rules are comprised of fixed and variable elements. The initial conditions are comprised of fixed, variable and random elements—modifying the variable elements of the interaction rules and the initial conditions responsive to interaction of the networked computing entities and exhibiting feedback of the group social behavior simulation to the user of at least one of the computing entities.

63 Claims, 9 Drawing Sheets

Block Diagram of a Single Card

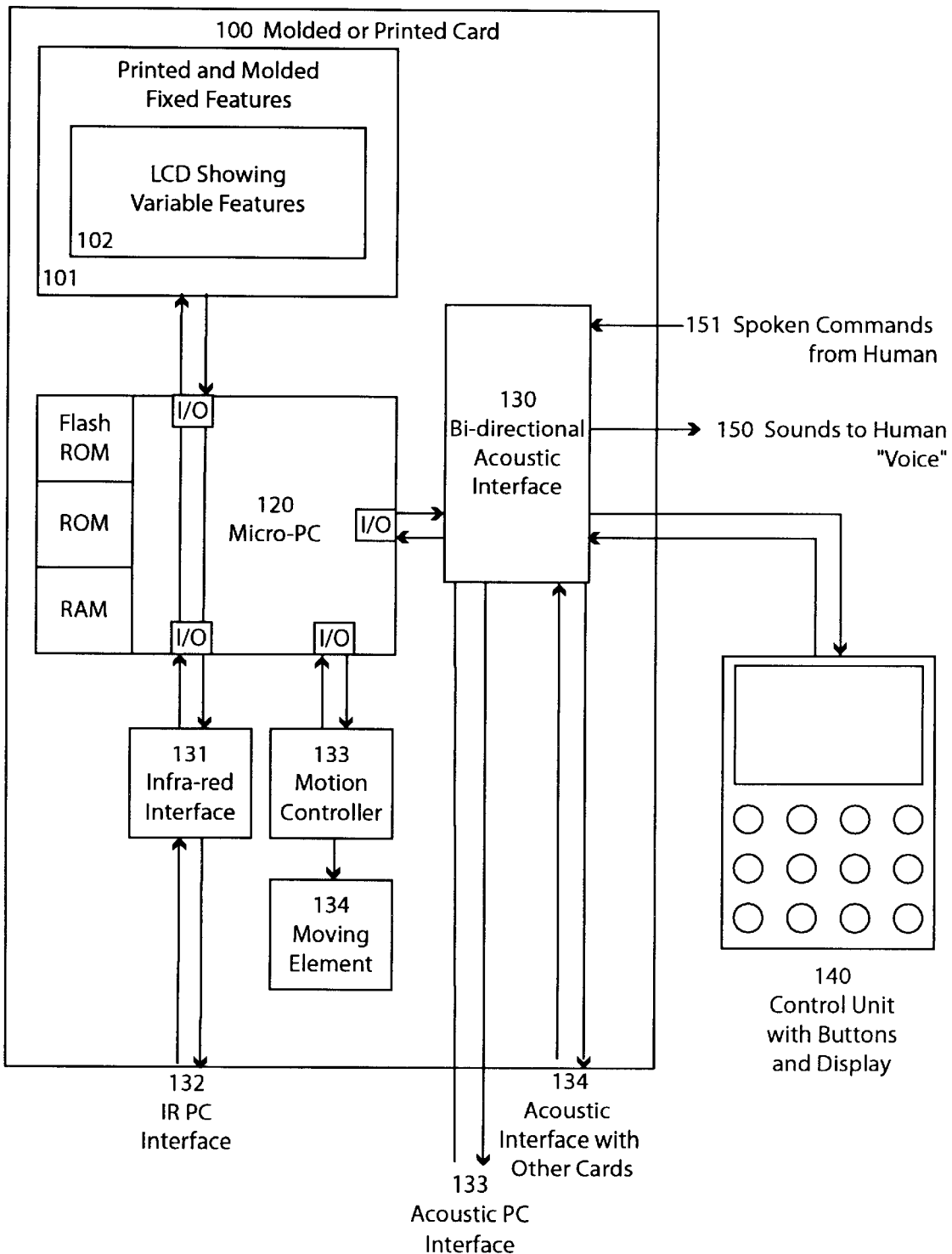
FIG. 1 Block Diagram of a Single Card

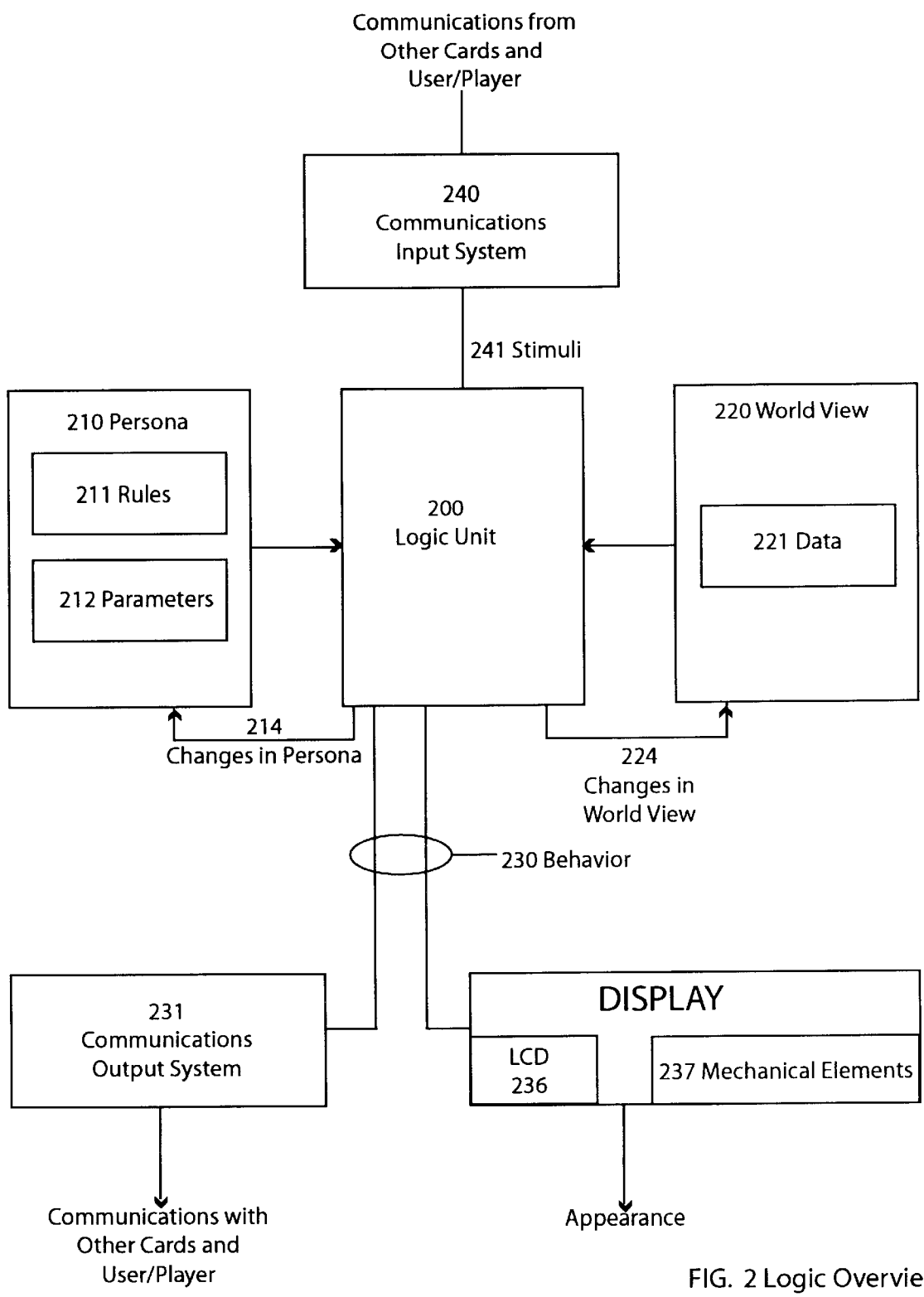
FIG. 2 Logic Overview

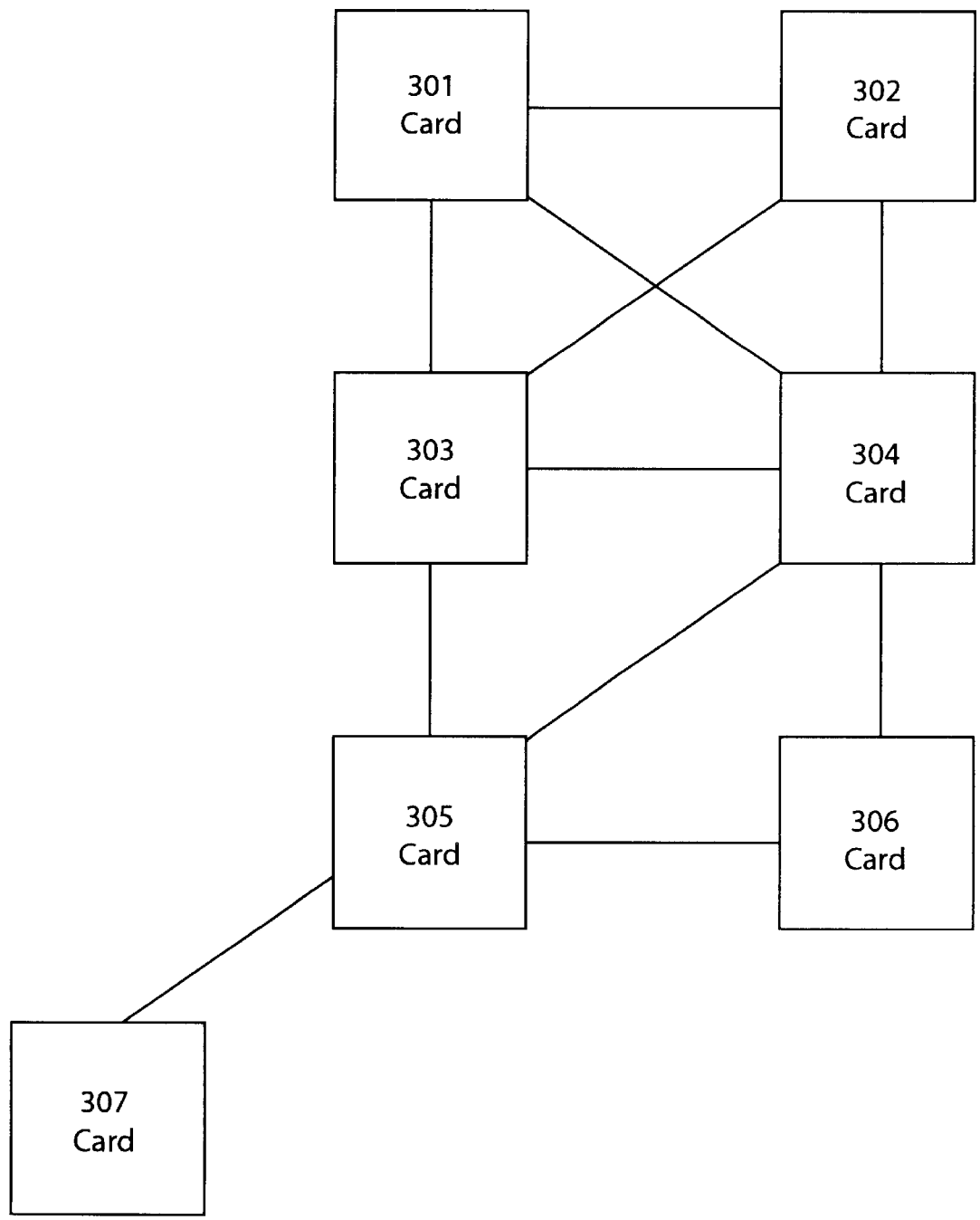
FIG. 3 System with Multiple Interacting Cards

```
Persona {
        Personality {
                name {family, individual},
                character {caste, rank},
                aggressiveness,
                garrulousness,
                self-centeredness,
                openness,
                truthfulness,
                strength,
                intelligence,
                amenability,
                sexuality {gender, orientation, drive, availability,
                        monogamy/polygamy}
        }
        Possessions {
                Wealth,
                Strength,
                Rank,
                Health,
                Wisdom,
                Sex
        }
        Appearance {
                Character {caste, rank},
                Gender,
                Beauty,
                Stature
        }
        Society {
                intimates
                cards
        users/players
        }
}
```

FIG. 4A

| | | |
|---|---|---|
| ETC A | Who's There? | Message #1<br>Address: All (empty field)<br>Sender: Family X<br>        Member Z<br>        Given Name A<br>Operator: Request for Information (RI)<br>Imperative Level: Moderate<br>Parameter Affected: Name {Personality}<br>Quantifier: All<br>EOM (End of Message) |
| ETC B | I'm B | Message #2<br>Address: Family X<br>        Member Z<br>        Given Name A<br>Sender: Family Q<br>        Member R<br>        Given Name B<br>Operator: Reply<br>Imperative Level: Null<br>Parameter Affected: Name {Personality}<br>Quantifier: All<br>Information: Family Q<br>        Member R<br>        Given Name B<br><br>EOM |
| A | How rich are you? | Message #3<br>Address: Family Q<br>        Member R<br>        Given Name B<br>Sender: Family X<br>        Member Z<br>        Given Name A<br>Operator: Request for Information<br>Imperative Level: High<br>Parameter Affected: Wealth {Posessions}<br>Quantifier: All<br>Information: Family Q<br>        Member R<br>        Given Name B<br><br>EOM |

FIG. 6A Example of Interaction Between Two ETCs

| | | |
|---|---|---|
| B | I'm very hostile. | Message #4<br>Address: Family X<br>         Member Z<br>         Given Name A<br>Sender: Family Q<br>         Member R<br>         Given Name B<br>Operator: Offer of Information<br>Imperative Level: Absolute<br>Parameter Affected: Amenability {Personality}<br>Quantifier: Maximum<br><br>EOM |
| A | I'm very strong.<br>I can lift 250 kilograms. | Message #5<br>Address: Family Q<br>         Member R<br>         Given Name B<br>Sender: Family X<br>         Member Z<br>         Given Name A<br>Operator: Offer Information<br>Imperative Level: High<br>Parameter Affected: Strength {Posessions}<br>Quantifier: 250<br><br>EOM |
| B | I've got 500 Crowns. | Message #6<br>Address: Family X<br>         Member Z<br>         Given Name A<br>Sender: Family Q<br>         Member R<br>         Given Name B<br>Operator: Reply<br>Imperative Level: Null<br>Parameter Affected: Wealth {Posessions}<br>Quantifier: 500<br>EOM |

FIG. 6B

| | | |
|---|---|---|
| B | Give me 100. | Message #7<br>Address: Family Q<br>         Member R<br>         Given Name B<br>Sender: Family X<br>         Member Z<br>         Given Name A<br>Operator: Request for Possesion<br>Imperative Level: High<br>Parameter Affected: Wealth {Possesions}<br>Quantifier: 250<br><br>EOM |
| A | Here's 100 Crowns | Message #8<br>Address: Family X<br>         Member Z<br>         Given Name A<br>Sender: Family Q<br>         Member R<br>         Given Name B<br>Operator: Delivery<br>Imperative Level: Absolute<br>Parameter Affected: Wealth {Possesions}<br>Quantifier: 100<br><br>EOM |

FIG. 6C

ELECTRONIC INTERACTIVE GAMING APPARATUS, SYSTEM AND METHODOLOGY

RELATED APPLICATIONS

Not Applicable.

FEDERALLY SPONSORED RESEARCH OR DEVELOPMENT

Not Applicable.

BACKGROUND OF THE INVENTION

This invention relates to electronic gaming apparatuses and more particularly to interactive electronic amusement apparatuses.

Electronic amusement apparatuses with visual or audio-visual displays are commercially available in many formats, ranging from the dedicated platforms of Sony [e.g.; PlayStation 2, PlayStation 1, Sony Windows CE Handheld, Sony VAIO laptop computer], Nintendo [e.g., Nintendo 64, Gameboy, Color Gameboy, etc.], Sega [e.g.; Dreamcast, Genesis, and handheld games such as the Game Gear which are linkable together], as well as open platform environments such as Windows, Macintosh, Windows CE, Unix, Linux, PALM, Sony Playstation 2, Microsoft X-Box, etc. Nintendo 64, Gameboy, Color Gameboy, etc.], Sega [e.g.; Dreamcast, Genesis, and handheld games such as the Game Gear which are linkable together], as well as open platform environments such as Windows, Macintosh, Windows CE, Unix, Linux, PALM, Sony Playstation 2, Microsoft X-Box, etc.

In the handheld and transportable area, the entries include the dedicated handheld games [e.g.: Nintendo Gameboy, Nintendo color Gameboy, SNK NeoGeo, Windows CE handhelds and compatibles, including those from Sony, NEC, Hewlett Packard, and Palm Pilot and compatibles, etc.]

In accordance with the teaching of one of present applicant's prior U.S. Patent '509, video games that can stand alone, or play as a linked video game apparatus in a distributed video game network are taught, and practiced in the industry many years subsequent to the issuance of the '509 patent, such as in products like the Nintendo Gameboy with links, the Sega Gamegear, and intranet, and internet networked environments.

In accordance with another aspect of the existing amusement gaming technology, user interaction with the video game is restricted to one of a set of defined paradigms. For example, if the user is playing in a game, then that user must elect to play stand-alone or networked, multiple user, and, furthermore, the interaction rules in either case are linear and fixed. That is, in an action game, or role playing game, or sports game, or whatever game, the user is playing in accordance with a defined set of game rules for either the single player stand-alone mode, wherein the only opponent is the computer, or in the multiple player networked player game mode, where each of the user's interactions causes responses in accordance with a fixed set of defined rules, and where further the user's conduct and results are visceral, that is, you win, you lose, you gain a possession, you lose a physical possession such as a sword or power pill, and you use up some amount of time, energy, points, etc. in the process of playing the game, which determines how long you're allowed to play the game.

It would be desirable to have an electronic gaming apparatus based on a visual display which provides multi-variable based interaction and behavior, and where the interactivity and networking aspects are enhanced to provide both more complex user-game interaction based on user behavior and input to the game, but to further provide for a multi-variable based inter-electronic gamecard apparatus in an interaction. However, none of the prior art systems are compatible, or can provide for either the physical communications hardware and software, or the software game design methodology or logic necessary to provide these features.

Another significant drawback of present-day games is that the characteristics of the activity (that is, the play) are established by the programming of the game, and therefore remain the same. While a particular game may have many distinct levels of difficulty, the characteristic responses within any one level are constant and unvarying. Therefore, once a player has mastered the highest level in the game, he usually loses interest quickly, as the challenge is no longer present.

SUMMARY OF THE INVENTION

An electronic trading card apparatus is comprised of a processing subsystem, a user input apparatus and a display. The processing subsystem has a processing logic section, memory for storing behavior rules, and a communications interface for interacting with other ones of the electronic trading card apparatus. The user input apparatus is for use by a player. The processing subsystem provides programmed functionality which in combination form a persona responsive to the behavior rules, the user input apparatus and the communications interface. The display provides for a display presentation to the player responsive to the persona formed by the processing subsystem.

An interactive amusement device exhibits a behavior, for use by a player in a system of a plurality of the amusement devices. Each amusement device is comprised of a feature controller, a communications interface, logic and a display. The feature controller selects from a defined set of features to define an amusement device persona, wherein each device has a separate persona that is initially set to an initial family value. The persona is comprised of several elements, with each of the elements comprising several variables, wherein each said variable has an initial value.

The communications interface communicates with other ones of the amusement devices. The user interface communicates with the player. The logic for determining behavior in response to at least one of communications from other ones of the devices and from the player. The display for providing a presentation of the behavior responsive to the respective amusement device persona.

In one embodiment, the display includes structural elements capable of physical mechanical motion. The display can also provide a visual and/or an audible presentation. In a preferred embodiment, the associated initial values are reassigned a unique value upon each initialization of the device. In a networked embodiment, a plurality of the devices are associated as members of a same family, wherein the members of the same family have the same initial family values. In a preferred embodiment for each device, members of the same family are further characterized in that the initial family value is modified by a factor to create a unique persona.

Thereafter, the behavior of the device is modified responsive to communications with at least one of the other ones of the devices.

In one embodiment, the feature controller is responsive to voice commands from the player to define the card persona. In one embodiment, the communications interface is an acoustic interface, which can provide inter-device audio communication within human range of hearing. The acoustic interface can also selectively further provide for response to human voice commands.

In one embodiment the device is further comprised of an interface to a control apparatus for providing means for the player to interface with the device. The interface to the control apparatus provides, inter alia, for player modification of the device persona, and/or for player selection of a game action. In one embodiment, the device is further comprised of a filter for selectively filtering communications received from the other ones of the amusement devices.

In an alternate embodiment, the device can provide means for receiving communications from a first one of the other ones of the devices and for forwarding the communications to a second one of the other ones of the devices. In the alternate embodiment the device can further comprise a filter for selectively filtering the communications from the first one of the other ones of the devices prior to forwarding to the second one of the other ones of the devices.

In a preferred embodiment, the feature controller is responsive to a defined set of rules for selecting from the defined set of features. The feature controller can alternately be programmed to define the rules, and/or the rules can be at least in part learned from the player use of the device.

In one embodiment, two or more of the devices can provide means for exchanging the persona for the device with ad for the persona of one of the other ones of the devices. As described in greater detail hereinafter, the persona is comprised of personality, possessions, appearance and society. Personality can be comprised of a plurality of variables each having an associated starting value that is initially assigned based upon a family value and a pseudo-random individual family member value, wherein the values of the variables are further modified thereafter responsive to experiences representative of at least one of communications with other ones of the devices and with the player, wherein the range of change of the values is limited to a defined set of thresholds.

Possessions (and/or appearance) can be comprised of a plurality of variables each of which has an initial value which is thereafter continually modified responsive to at least one of the communications with at least one of the other devices and the player. The initial value for the variables for the possessions can be a fixed value, a random number, assigned at manufacture and/or assigned upon initialization. Society can be comprised of a plurality of variables that have no initial value, but are defined by the interaction that each of the devices undergoes with at least one of other ones of the devices and with the player. In a preferred embodiment, the behavior is in part exhibited as changes to the appearance of the device. The initial value of each of the variables is selectively further modified by an additional factor, resulting in a unique persona for the device. In a preferred embodiment, the device as in claim 1, wherein selected ones of the variables are further modified responsive to experience comprising communications and interaction of the respective device with at least one other one of the devices and the player.

The variables for personality can be further comprised of at least one element of a family name, an individual name, a character, a caste, a rank, aggressiveness, garrulousness, self-centeredness, altruism, openness, truthfulness, strength, intelligence, amenability, hostility, gender, sexual orientation, sexual drive, sexual availability, and sexual monogamy. The variables for the possessions can be comprised of elements of wealth, rank, health, wisdom, and sex. The variables for the appearance can be comprised of elements of at least one of character caste, character rank, gender, beauty, and stature.

The variables for the society can be comprised of elements of other ones of the devices which share a common value of one of the variables with the respective device, and in communication with the respective device, a player in communication with the respective device, and communication with other ones of the devices which do not share a common value of one of the variables with the respective device.

In one embodiment, at least two selected ones of the devices interact in a role-playing game responsive to the logic which is responsive to stored game rules and data. In an alternate embodiment, the player can masquerade as a device, substituting for defined game rules and data to appear as a selected one of the devices in the role-playing game. The play of the role-playing game is comprised of a series of conversation interactions among the selected ones of the devices.

In a preferred embodiment, wherein the interaction among the selected ones of the devices occurs in a hierarchical order directly based on relative proximity of the selected devices to one another. The conversation interactions can be comprised of an introductory conversation from a first one of the devices and a reply response providing information on the variables of the persona of the second one of the devices.

In one embodiment, the first one of the devices communicates via the second one of the devices to indirectly communicate with a third one of the devices.

In a further embodiment, the second one of the devices provides an additional response of an introductory conversation to the first one of the devices, wherein the first one of the devices responds to the additional response of the introductory conversation by providing an additional reply response to the second one of the devices. The reply response results in a transfer of at least a portion of the value of a selected one of the variables from the second one of the devices to the first one of the devices.

The transfer can alternatively result in a change to the value of the respective variables of both devices in the transfer, or only result in a change to the value of the respective variable in only one of the devices in the transfer. The transfer of the value for the respective variable is governed by predefined rules associated with the respective variable. Each device can communicate with at least one of the players and at least another one of the devices. The device communicates at any given time with only one of the other ones of the devices. Each device can provide an active game with an associated display. The active game is divided into phases comprising a discovery phase and an active play phase.

A method of communicating is provided amongst a network of networked computing entities to provide feedback to a user representative of a group social behavior comprising and providing a uniform data structure for each said computing entity which defines group social behavior simulation and the data structure comprising interaction rules and initial conditions. The interaction rules are comprised of fixed and variable elements. The initial conditions are comprised of fixed, variable and random elements—modifying the variable elements of the interaction rules and the initial conditions responsive to interaction of the networked computing entities and exhibiting feedback of the group social behavior simulation to the user of at least one of the computing entities.

It is therefore an object of the present invention to provide a game that has ever-changing characteristics, in addition to being easily reprogrammed by the user/player.

It is a further object of the present invention to provide a multi-variable interactive electronic game apparatus.

It is a further object of the present invention to provide for a new and novel intergaming apparatus communications architecture, protocol, and implementations, to facilitate interamusement gaming apparatus communication.

It is a further object of the present invention to provide the methodology and structure for controlling and managing visual display generation for each of the electronic gaming apparatus based on the "persona" of the particular respective gaming apparatus, [which "persona" is itself a multi-variable aspect], but is also responsive to the "personae" of other nearby game apparatus that may be within communications range of the first game apparatus [this interaction is also multi-variabled, for instance, depending on the relative distance from the particular game apparatus to the specific nearby game apparatus, the persona of the specific apparatus and the status of the interaction activity being communicated with the particular game apparatus and the other specific game apparatus].

It is a further object to provide a computing entity (or electronic gaming apparatus) which exhibits the personae and can be utilized for general or specific group social behavior simulations and feedback.

These and other aspects and attributes of the present invention will be discussed with reference to the following drawings and accompanying specification.

BRIEF DESCRIPTION OF THE DRAWINGS

FIG. 1 is a block diagram of the single electronic trading card;

FIG. 2 is an overview of the logic that is implemented by the software and the micro-PC as illustrated in FIG. 1;

FIG. 3 shows the various types of interaction that can occur in a system, a situation with multiple interacting ETCs;

FIG. 4A shows the data structure of the rules portion of the persona;

DETAILED DESCRIPTION OF THE PREFERRED EMBODIMENT

Figure 4B:
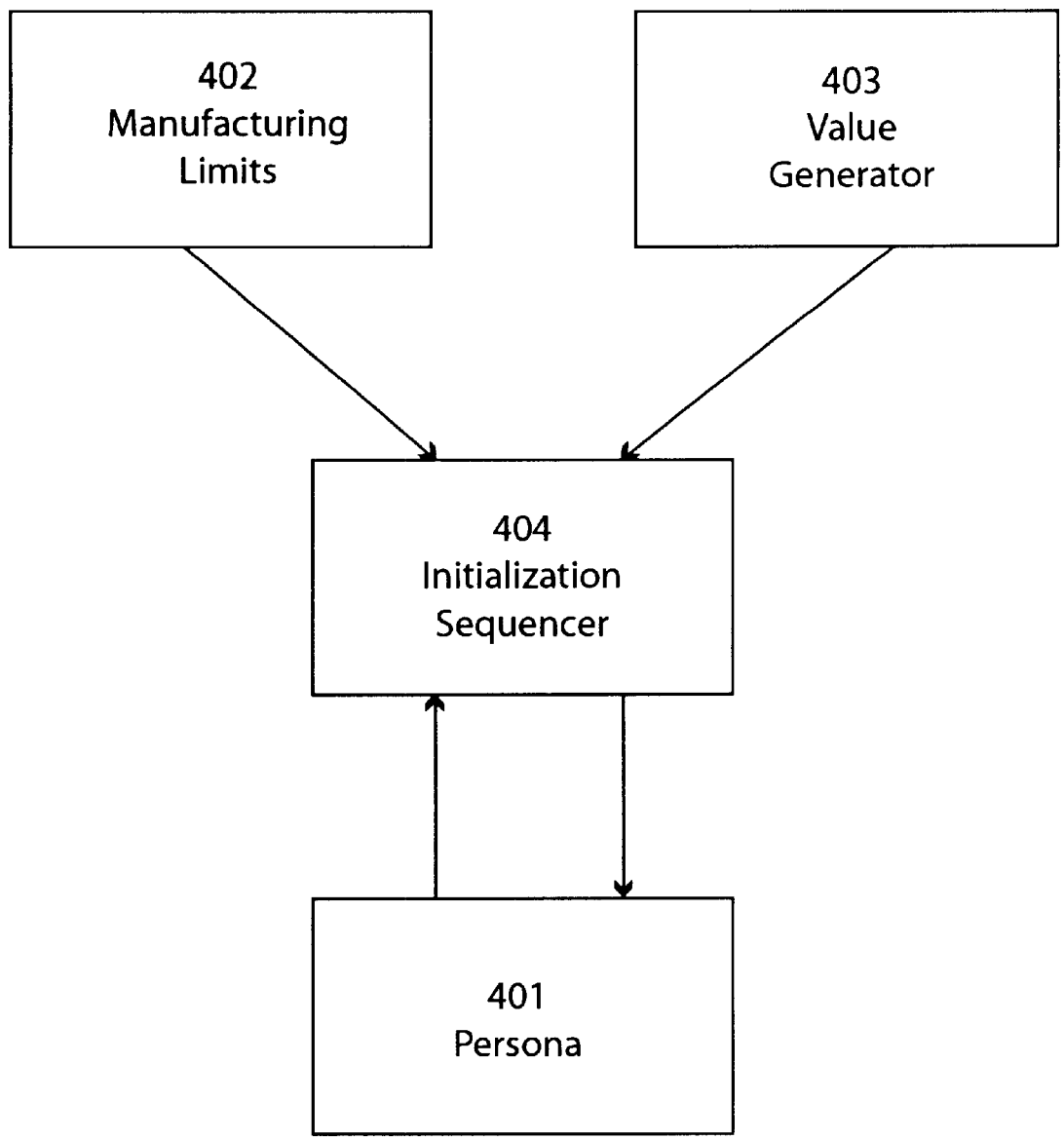
FIG. 4B shows the initialization that takes place at the start of each game or simulation sequence.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

In accordance with one aspect of the present invention, the communication between the game apparatus can be provided in an audible output which is perceivable by the human users, either by communicating inter-card in the audible range or providing audible output in addition to whatever other inter-card communications is provided. In this way, the user will not necessarily understand all the communications, but will recognize distinctive audio patterns or signatures associated with the audio communications between the game apparatus.

In accordance with one aspect of the multi-variable persona and interaction, a set of families can be sent out, such as 100 [or any number] of families which are the set of families. Within those families there are members of the family. Thus, just as in real world, there are last names and first names, and oftentimes people of the same family have similar personae, that is, they are similar in many ways though not identical, or in some cases even alike. Likewise, within a family, having a defined persona, there is much variation due to the multi-variable nature of the present invention, where certain aspects of persona are adaptive and learned in accordance with defined nested multi-variable rules. Thus, a game developer, provided with the development interface hardware and software, can create a new family with defined members, or can add members to an existing one of the set of families.

An additional novel aspect of the present invention relates to the unique nature of each individual electronic gaming apparatus in that it develops a unique specific persona which is adaptable and interactive, starting from a defined particular persona from within a defined set of personae.

In accordance with another aspect of the present invention, a set of interactive electronic trading cards ["ETC"] is provided, much in the spirit of baseball and other sports and hobby trading cards which are printed on paper stock, and provide a whole genre of gaming amusement. For example, with the use of a control unit coupled externally to the ETC, various user inputs can be communicated to or programmed into that particular ETC. Additionally, a separate processor direct interface is provided for coupling to either a developer system or other computing apparatus. In addition, a communications interface can be provided to permit remote communication, plug-in memory device couplings or other ways to supplement, alter or modify the ETC.

In accordance with another aspect of the present invention, communication is provided in an audible spectrum, both between the ETCs, and in the preferred, embodiment between the ETC and its owner. In one embodiment, the communications between the ETCs is entirely contained within the audible range, while in an alternate embodiment the communication is contained outside the audible range, in addition to or separate from the audible aspect of communication for perception by the human user. It is to be understood that this audible aspect of the ETCs is in addition to and complementary with the visual communication aspect of the ETC.

In a preferred embodiment, the ETC provides visual communication both through an electronic display [such as a liquid crystal display, LCD] and through three-dimensional physical attributes [such as molded plastic] and graphical aspects [e.g., color, textural wording, etc.]. This interaction may be further enhanced by adding mechanical motion or visual display, allowing, for example, eye motion, facial expression, or hand gestures.

In accordance with a further aspect of the present invention, within the audible communication, the persona of the ETC is reflected in the audible, such as women's voices being higher in pitch than men's voices, shyness equating to softspokeness, boldness equating to speaking more loudly, in both cases tempered by emergency or other occasion in either direction of speaking soft or loud. In accordance with another aspect of the present invention, the ETCs provide for transfer of both individual features and entire personae between agreeing and consenting ETCs. Again, in the spirit of paper trading cards, people get tired of the trading card they might have and might like to try a different type of trading card. For example, a warrior may want to become royalty, or vice versa. A princess may want to become a ballerina or a performer of other sort. Thus, in the spirit of trading cards, you can trade your card. This can be done by physically trading the card, which would be appropriate where there was a physical aspect of the gaming apparatus embodying the ETC which was unique [e.g., a man versus a woman, a giant versus a midget, etc.]. However, in a preferred embodiment, the physical attribute is interchangeable or modifiable on a person's own ETC.

In a preferred embodiment of this aspect of the invention, the persona interchange can be accomplished with the same medium of communication [in the preferred embodiment having the audible component] so that owners of electronic trading cards (the ETCs) can "swap" all or part of their existing ETC for someone else's, or can perhaps "clone" one from another.

Of course, the persona of any particular ETC depends not only on its original "programming" but also on its experience. Therefore, no two ETCs will be identical, except for the instance of manufacture or of "cloning".

Architecturally, the ETC is comprised of a processing subsystem component including processing logic, nonvolatile storage memory, working writable reusable storage area, and communications interfaces, as well as conventional power supply user interfaces, housing, etc.

In accordance with another aspect of the present invention, interaction between ETCs is complex and multivariable. Personae can include degrees of truthfulness and lying, kindness and meanness, and other attributes and features as described herein after as elements of the person.

In accordance with another aspect of the present invention, even the concept of communication is multivariable. There is of course direct communication of something from one to another ETC, and possibly back again or there from/to yet another ETC, and so forth. In much the same nature as a story being told and repeated gets altered, information passing between personae can change in accordance with aspects of the persona such as memory, truthfulness, boastfulness, and so forth.

In addition with another aspect of the present invention, the communications is additionally affected by the topography of the totality of ETCs interacting. For example, between ETCs which have other ETCs spaced and intercepting, and/or forwarding communications with more then one ETC. As the number of ETCs in the communications grows, and as the number of ETCs in a given chain of communications increases, the authenticity, or original content, of the communications is altered. In accordance with another aspect of the present invention, an interactive gaming environment is provided where the player/user can respond in real time to the visual and audio presentations provided by the user's ETC so as to adapt for and respond to what is happening with other ETCs, utilizing the user/player's responses including reflexes, intuition, and strategies.

Definition of Persona

Each device has a persona that is set to some initial value at the time of manufacture or initialization. The persona of a particular device consists of several elements, each element comprising several variables. Each such variable has an initial value that is set at manufacture, which value may be zero for certain variables of some elements, and in other cases determine the initial "genetics" of the character represented by the particular device.

Each such variable may be further modified at the time of manufacture/initialization by a random factor, resulting in a unique persona for each such device. Certain of the variables may be further modified by the experiences that each device undergoes as it is used/played; that is, communications/interaction with other devices and with user/players.

In the described implementation, the basic elements of the persona are as follows:

I. Personality
II. Possessions
III. Appearance
IV. Society

Personality is further divided into the variables of:

1) name; which is further divided into caste, family, and individual;
2) character; which is further divided into caste and rank;
3) aggressiveness;
4) garrulousness;
5) self-centeredness; (the opposite of altruism)
6) openness
7) truthfulness;
8) strength;
9) intelligence
10) amenability (the opposite of hostility)
11) sexuality; which is further divided into gender, orientation, drive, availability, and monogamousness;

Possessions is divided into the variables of:

1) wealth
2) rank
3) health
4) wisdom; and
5) sex

Appearance is divided into the variables of:

1) character, which is further divided into caste and rank, but which need not be identical to the variable of the same name in "Personality";
2) gender; which in a similar fashion need not be identical to that within the variable of sexuality;
3) beauty; and
4) stature and Society consists of:

1) cards (other devices) in caste in contact (that is; intimates); and
2) other cards in contact; and
3) users/players in contact (user/players may be disguised as other cards/devices)

Use in a Game

One of the purposes to which the ETCs may be put is in a role-playing game in which each of several different ETCs take part, and a player/user may or may not take part, usually (but not necessarily) behaving and appearing to be (masquerading as) an ETC. The play consists of a series of interactions ("conversations") among ETCs that are nearby to each other, and then in turn among ETCs that are further separated.

Each such conversation starts with an introductory phase consisting of one asking the other "who are you?" in the digital language of the ETCs. The second ETC in that conversation would then reply with the basic information about its caste, rank, etc from the "Appearance" element, which of course need not be exactly equivalent the that in the "personality" element, depending on the value of the "truthfulness" variable.

The second ETC might then ask the first for the same basic information. After this first transaction, there might (depending on a random factor present in all transactional opportunities) occur a second where one asks the other "who is behind you?"; that is, "what other ETCs are you in contact with that I may not be?". The basic information about these second-level communicants would then be transferred, potentially modified according to the degree of "truthfulness" of the reporting ETC.

A third stage of the interaction might result in the transfer of some degree of one or more of the variables in the element "Possessions" from one ETC to another. This transfer would be regulated by the current values of the elements of Personality. For instance, if one ETC of a specific rank encounters one of a higher rank and with a larger degree of Aggressiveness, there might result a transfer of Wealth from the former to the latter.

Similarly, the proper conjunction of the variables within Sexuality and Appearance might result in the transfer of Sex from one to the other. In this case, the sum is not a constant; that is, both may gain Sex, or even neither.

Just as in humans, the transfer of Possessions among ETCs is governed by rules peculiar to each variable within the element. For instance:

1. Wealth is lost by one party and gained by the other in equal amounts;
2. Wisdom may be given, but the giver's store does not decrease as a result;
3. Health may be taken, but is usually not given; the taker's own store does not increase, although a giver's may decrease.
4. Rank may be given without loss of the giver's store, but under certain circumstances such a gift may result in loss, for instance if given to one of much lower rank;
5. Sex may be given with a net increase for both giver and receiver, or it may be taken (by one of higher rank or greater strength for example), in which case there is always an increase in hostility (decrease in amenability)

Thus, the active game may be divided into phases, consisting of:

1. discovery phase, consisting of each card leaning about its close neighbors, and then getting reports on its neighbors' neighbors. During this phase, the characteristics reported may be untrue, due to the action of the truthfulness variable.
2. the active play phase, during which requests for more detailed information are processed, followed by requests and demands for possessions, perhaps with offers.

Interaction Between ETCs and a Human User/Player

There two different manners in which the user/player can interact with the set of ETCs that he/she is using. First, he/she may arrange the ETCs in a pattern of his choice, establishing proximity, and therefore strongest interaction, among certain ETCs, in order to obtain a particular interaction. Having established the initial conditions, he would then observe the resulting activity without interfering; the outcome would depend entirely on his skill in establishing the start-of-play arrangement. This might be termed Observer mode.

Alternatively, he may disguise himself as another ETC; that is, as far as the reactions of the ETCs with which he interacts are concerned, he is just another ETC. This is accomplished by providing an ETC with a special interface that allows the user/player direct access to the appropriate parameters of the appearance segment of the persona, and therefore control over the responses of his character to communications initiated by other ETCs. This would be termed Immersive mode.

In this mode, he can further initiate communications with other ETCs as desired, using the established communications protocols for that purpose.

Each of these modes has two further alternatives: Normal and Omniscient. In a Normal mode, the user/player would be able to observe only the same information that another ETC would have access to; that is, his observations would be subject to the same degree of dishonesty, secretiveness, and so forth, that one ETC would use to another—the user/player would not be able to "see the truth". In an Omniscient mode, the player/user would be able to observe the entire set of parameters in each ETCs persona at will, thereby "seeing through" the distortions inherent in normal communications.

Therefore, in Omniscient Observer mode, the player/user would be able to see the developing relationships among the ETCs, and would be able to observe the distortions that each ETC introduces to gain a desired response from other ETCs.

In Omniscient Immersive mode, the player/user would be able to "see through"the distortions in the same manner, and therefore would be better equipped to gain the desired responses himself.

FIG. 1 is a block diagram of the single electronic trading card. This card comprises a microprocessor 120 with ROM, RAM, Flash, Programmable ROM and multiple I/O interfaces to the other element. A liquid crystal or similar display 102 showing variable features is embedded in the printed and molded fixed features 101 and coupled to one of the I/O ports on micro-PC 120. A bi-directional acoustic interface 130 coupled to another one of the I/O ports on micro-PC 120. This bi-directional acoustic interface can accept spoken commands from the human player/user through port 151, and can project sounds to the human through port 150, thus implementing its voice, that is what's perceptible by the human. Optionally, another acoustic link can connect to a control unit 140 with buttons and display, is suitable for use by a human player/user. A fourth acoustic interface 134 for purposes of exchanging information and commands and requests with other electronic trading cards and a final acoustic interface 133 that is designed for interacting with a hosting or programming personal computer or other computing device. There also can exist an infrared interface 131 that can alternatively form the interface to the PC described above or to the user/player control unit.

The software in the micro-PC 120 is programmed to create the logic that creates the behaviors driven by the elements and variables described in other places that actually form the personality, the persona, of the particular electronic trading card.

Further, a motion controller 133, connected to micro-PC 120 via an I/O port, activates moving element 134 under command of micro-PC 120.

FIG. 2 is an overview of the logic that is implemented by the software and the micro-PC described earlier. It comprises a logic unit 200 that contains the rules by which the various decisions are made. The primary input to this logic unit is from the communications input system 240 whereby flow stimuli 241 from other cards or from other user/players in the system. The logic unit is similarly fed by the persona 210 comprising a set of behavior rules 211 and the individual parameters determining the unique characteristics of that particular electronic trading card. These parameters comprise element 212. Changes to the parameters in the persona flow from the logic unit through the change path 214. Another input to the logic unit is from the particular electronic trading card's world-view block 220 comprising a variety of data elements 221 describing the social environment of that particular card, that is the data the card has collected about other cards and user/players in its vicinity that it must interact with. Changes in the world-view flow up via path 224 from the logic unit 200 to world-view 220. As a result of computations in the logic unit, not only are changes in the persona 210 executed and changes in the world-view 224 executed, but changes in the appearance of the individual electronic trading card (ETC) flow through the behavior channel 230 to the display elements 235 which in turn may comprise a liquid crystal or other display 236 and potentially mechanical elements, such as moving arms, etc., elements 237. Together these comprise the appearance of the individual electronic trading card. Further behavior is transmitted via behavior channel 230 to the communications output system 231 where it may send information about itself, etc. to together electronic trading card and to the user in this role as an electronic trading card. Furthermore, this communications output system may send information that is orally significant to the human, albeit that information would always be contained or at least hinted at by information sent via the data communications channel that 231 also implements.

FIG. 3 shows the various types of interaction that can occur in a system, a situation with multiple interacting ETCs. In this particular case, cards 301, 302, 303, and 304 may directly interact with one another as shown via the connecting lines. Card 305 may interact directly with cards 306, 307, 304, and 303 as shown by the connecting lines. Any communications that card 305 has with cards 301 and 302 can only be consummated by passing through, by being relayed by card 303 and/or card 304. Therefore, the understanding that card 305 has about 301 and 302 is subject to filtering by the biases of cards 303 and 304. This establishes another important aspect of the game. Cards 303 and 304 may well lie to card 305 when they relay the information about cards 301 and 302. This filtering can have a very large effect on the outcome of the game, insomuch as some of the decisions that card 305, some of its behavior, may be as a result of false information about cards 301 and 302. Card 306 is in a similar position with regard to cards 301 and 302. Card 307 can communicate directly only card 305, therefore, not only is its knowledge about cards 303, 304, and 306 subject to the same degree of filtering as described about card 305 above, but further, its knowledge about cards 301 and 302 can be filtered by as many as two, or in an extreme case, three other cards on its way. So, in fact, it may get quite conflicting information about cards 301 and 302 as relayed by, for instance, cards 303 and 305 in one case, cards 304 and 305 in a second, and cards 304, 306 and then 305 in a third case. Again, this can have a dramatic effect on the behavior of card 307 with regard to its understanding of the character of cards 301 and 302. Just as in human society, the results of miscommunication, filtering, and just plain untruths can be seen and might be dramatic.

FIG. 4A shows the data structure of the rules portion of the persona. As can be seen, the persona consists in this case of four elements, that is, personality, possessions, appearance, and society. Each of those primary elements is further divided into a number of variables. Some of the variables, in turn, are divided into sub-variables. For example, the first element in personality is "name", which is divided into "family" and "individual", just as human names are divided into given names and family name. "Character" is similarly divided into the sub-variables of "caste" and "rank". Aggressiveness, garrulousness, self-centeredness, openness, truthfulness, strength, intelligence, and amenability are single variables and sexuality, in fact, has in this implementation, four sub-variables, which all have important bearing upon the interaction of this card with another.

FIG. 4B shows the initialization that takes place at the start of each game or simulation sequence. The individual Computing Element's Persona 401 holds values that are either the result of the last game or sequence; or those implanted at the time of manufacture or "hard reset". The Initialization Sequencer 404 reads each element of the Persona 401 in turn, compares it with the appropriate element in the Manufacturing Limits, resetting it to a mid-level when the limits are exceeded; modifying it by an amount from the Random Value Generator; and writing it back to the appropriate element of the Persona 401.

The Initialization Sequencer 404 then repeats the above sequence for the next element of the Persona, continuing until all elements have been processed.

Figure 5:
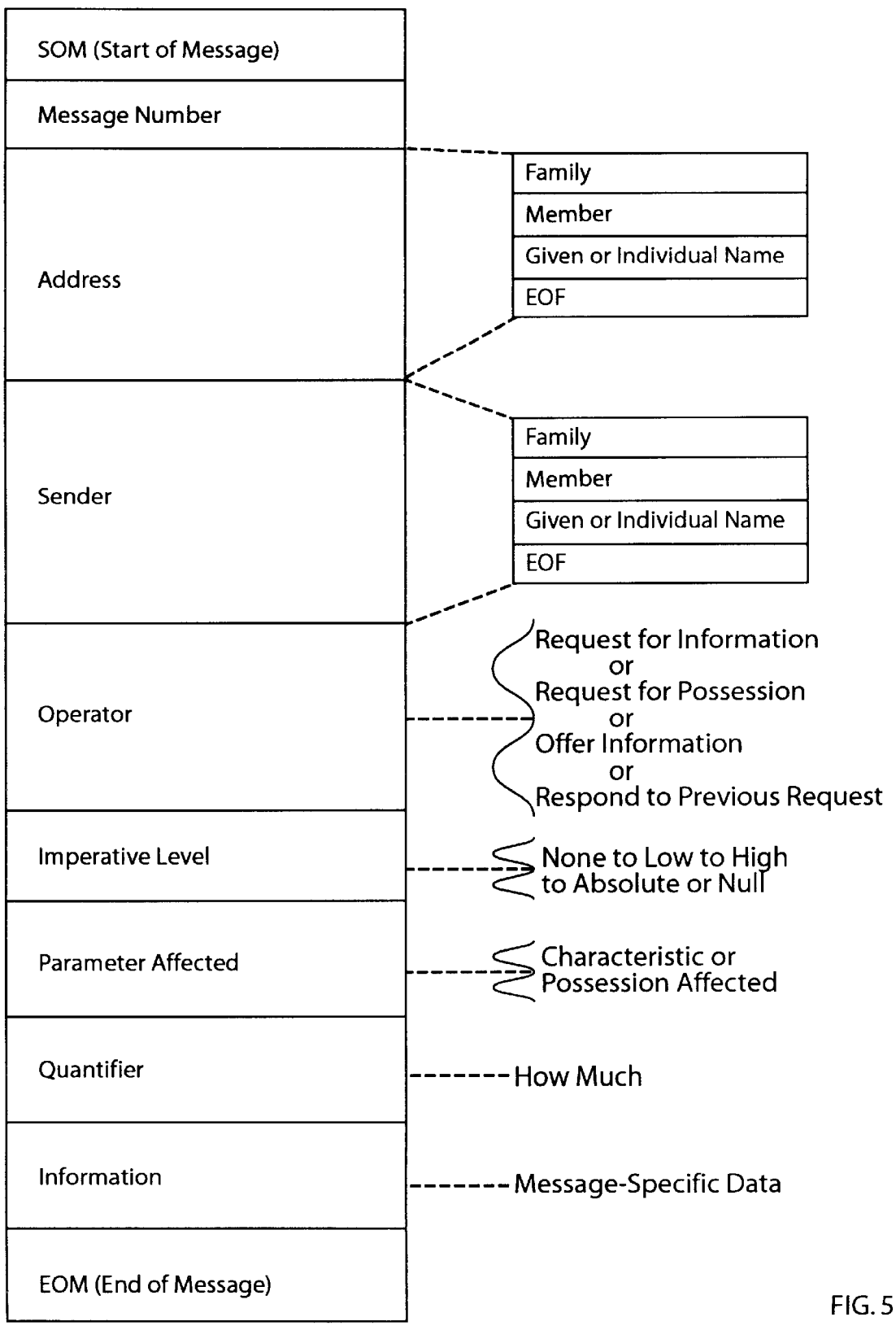
FIG. 5 shows the communications message format used between ETCS in the preferred embodiment; and, FIGS. 6A–C illustrate the interaction between two ETCs.

FIG. 5 shows the communications message format used between ETCS in the preferred embodiment. Each message is composed of a series of fields, each field being either a key-word, or a modifier or data field associated with the key-word. Each field is terminated by an end-of-field character, EOF.

First is a start-of-message character, SOM. The SOM is immediately followed by a message number, used to detect and deal with missing or duplicate message transmissions. The next field is the address field. The address may point to a particular other entity in the network by name, rank, an individual or given name. Or it may be more general, that is, all members of the family Stuart.

The third full field is the identity of the sender. This field may be further modified by characteristics as yet undefined.

The next field is the operator that defines the purpose of the message. For example, it may be a request for information, "RI"; a request for possessions, "RP"; an offer of information, "OI"; an offer of possessions, "OP"; a reply to a previous specific inquiry; or another operator that may be defined at a later time.

The next field is the imperative level of the preceding operator, ranging from none to very high, with allowance for an absolute; or it may be a null; that is, have no meaning.

The sixth field is the definition of the information or possession to which the message relates; that is, a pair of pointers, or in the preferred embodiment, names, referring to one of the fields defined in FIG. 4.

The seventh field is the amount, quantity, or depth of the information or possession involved.

The eighth and last full field is reserved for message-specific data, as may he necessary for some specific interactions.

Finally, the message is terminated by and End-Of Message character, EOM.

FIGS. 6A–C provide an illustration of interaction between two ETCs. The interaction starts with message number 1, sent by A. B the replies with his full name.

In message 3, A then requests of B a report on B's level of wealth, which B refuses to answer, instead stating his hostility level via message 4.

In return, A attempts to cow B with his great strength. B quickly complies via message 6—"I've got 500 crowns." Of course, if B's propensity to lie is substantial, controlled by a low value for the Truthfulness field in "his" persona (persona is detailed in FIG. 4), then the answer given to A may not at all reflect the truth—B's Wealth variable may in fact hold several thousand crowns.

A then demands 100 crowns, which B hands over in message 8. As a result of this interchange, A's wealth variable will he increased by the 100 crowns, and B's decreased. Simultaneously, B's amenability variable may be decreased, reflecting B's hostile reaction to the interchange; the amount depending on a random choice and on other rules that the character's designer may elect to include.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. An interactive computing device exhibiting a behavior, for use by a player in a system of a plurality of the computing devices, each computing device comprising:
   a) a feature controller for selecting from a defined set of features to define a computing device persona, wherein each device has a unique persona that is initially set to an initial family value;
      wherein the persona is comprised of several elements, with each of the elements comprising several variables;
      wherein each said variable has an initial value;
   b) a communications interface for communicating with other ones of the computing devices;
   c) a user interface for communicating with the player;
   d) logic for determining behavior in response to at least one of communications from other ones of the devices and from the player; and
   e) a display for providing a presentation of the behavior responsive to the respective computing device persona.

2. The device according to claim 1, wherein the display includes structural elements capable of physical mechanical motion.

3. The device as in claim 1, wherein the display provides at least one of a visual and an audible presentation.

4. The devices as in claim 1, wherein the associated initial values are reassigned a unique value upon each initialization of the device.

5. The device as in claim 1, wherein a plurality of the devices are associated as members of a same family, wherein the members of the same family have the same initial family values.

6. The device as in claim 5, wherein members of the same family are further characterized in that the initial family value is modified by a factor to create a unique persona for each device.

7. The device as in claim 1, wherein the behavior of the device is modified responsive to communications with at least one of the other ones of the devices.

8. The device as in claim 1, wherein the feature controller is responsive to voice commands from the player to define the device persona.

9. The device as in claim 1, wherein the communications interface is an acoustic interface.

10. The device as in claim 9, wherein the acoustic interface provides inter-device audio communication within human range of hearing.

11. The device as in claim 9, wherein the acoustic interface further provides for response to human voice commands.

12. The device as in claim 1, further comprising:
    an interface to a control apparatus for providing means for the player to interface with the device.

13. The device as in claim 1, further comprising:
    a filter for selectively filtering communications received from the other ones of the computing devices.

14. The device as in claim 13, wherein the filtering selectively modifies the communications received from the other ones of the computing devices.

15. The device as in claim 1, further comprising means for receiving communications from a first one of the other ones of the devices and for forwarding the communications to a second one of the other ones of the devices.

16. The device as in claim 15, further comprising:
    a filter for selectively filtering the communications from the first one of the other ones of the devices prior to forwarding to the second one of the other ones of the devices.

17. The device as in claim 1, wherein the feature controller is responsive to a defined set of rules for selecting from the defined set of features.

18. The device as in claim 17, wherein the feature controller is programmable to define the rules.

19. The device as in claim 18, wherein the rules are at least in part learned from the player use of the device.

20. The device as in claim 1,
    wherein the persona is comprised of "personality;
    wherein the personality is comprised of a plurality of variables each having an associated starting value that is initially assigned based upon a family value and a pseudo-random individual family member value, wherein the values of the variables are further modified thereafter responsive to experiences representative of at least one of communications with other ones of the devices and with the player, wherein the range of change of the values is limited to a defined set of thresholds.

21. The device as in claim 1,
    wherein the persona is further comprised of possessions;
    wherein the possessions comprise a plurality of variables each of which has an initial value which is thereafter continually modified responsive to at least one of the communications with at least one of the other devices and the player.

22. The device as in claim 21, wherein the initial value for the variables for the possessions is at least one of a fixed value, a random number, assigned at manufacture, and assigned upon initialization.

23. The device as in claim 1, wherein the persona is comprised of appearance;
    wherein appearance is comprised of a plurality of variables each of which has an initial value which is thereafter continually modified responsive to at least one of the communications with at least one of the other devices and the player.

24. The device as in claim 1, wherein the persona is comprised of society;
    wherein society is comprised of a plurality of variables that have no initial value, but are defined by the interaction that each of the devices undergoes with at least one of other ones of the devices and with the player.

25. The device as in claim 1, wherein the user interface and the communications interface are multiplexed.

26. The device as in claim 1, wherein the behavior as exhibited includes changes to the appearance of the device.

27. The device as in claim 2, wherein the motion is comprised of movement of a portion of the device to create a gesture.

28. The system as in claim 1, wherein the initial value of each of the variables is selectively further modified by an additional factor unique to the respective device, resulting in a unique persona for the device.

29. The device as in claim 28, wherein the additional factor is a random number.

30. The device as in claim 1, wherein selected ones of the variables are further modified responsive to experience comprising communications and interaction of the respective device with at least one other one of the devices and the player.

31. The device as in claim 1, wherein the persona is comprised of the elements of personality, possessions, appearance, and society.

32. The device as in claim 20, wherein the variables for personality are further comprised of at least one element of a family name, an individual name, a character, a caste, a rank, aggressiveness, garrulousness, self-centeredness, altruism, openness, truthfulness, strength, intelligence, amenability, hostility, gender, sexual orientation, sexuality drive, sexual availability, and sexual monogamy.

33. The device as in claim 21, wherein the variables for the possessions are comprised of elements of at least one of wealth, rank, health, wisdom, and sex.

34. The device as in claim 23, wherein the variables for the appearance are comprised of elements of at least one of character caste, character rank, gender, beauty, and stature.

35. The device as in claim 24, wherein the variables for the society arc comprised of elements of other ones of the devices which share a common value of one of the variables with the respective device, and in communication with the respective device, a player in communication with the respective device, and communication with other ones of the devices which do not share a common value of one of the variables with the respective device.

36. The device as in claim 1, wherein at least two selected ones of the devices interact in a role-playing game responsive to the logic which is responsive to stored game rules and data.

37. The device as in claim 1, wherein the player can masquerade as a device, substituting for defined game rules and data to appear as a selected one of the devices in the role-playing game.

38. The device as in claim 36, wherein play of the role-playing game is comprised of a series of conversation interactions among the selected ones of the devices.

39. The device as in claim 38, wherein the interaction among the selected ones of the devices occurs in a hierarchical order directly based on relative proximity of the selected devices to one another.

40. The device as in claim 38, wherein the conversation interactions is comprised of an introductory conversation from a first one of the devices and a reply response providing information on the variables of the persona of the second one of the devices.

41. The device as in claim 40, wherein the first one of the devices communicates via the second one of the devices to indirectly communicate with a third one of the devices.

42. The device as in claim 40, wherein the second one of the devices provides an additional response of an introductory conversation to the first one of the devices, wherein the first one of the devices responds to the additional response of the introductory conversation by providing an additional reply response to the second one of the devices.

43. The device as in claim 40, wherein the reply response results in a transfer of at least a portion of the value of a selected one of the variables from the second one of the devices to the first one of the devices.

44. The device as in claim 43, wherein the transfer results in a change to the value of the respective variables of both the devices in the transfer.

45. The devices as in claim 43, wherein the transfer results in a change to the value of the respective variable in only one of the devices in the transfer.

46. The device as in claim 43, wherein the transfer of the value for the respective variable is governed by predefined rules associated with the respective variable.

47. The device as in claim 1, wherein the device communicates with at least one of the player and another one of the devices.

48. The device as in claim 1, wherein the device communicates with multiple players.

49. The device as in claim 1, wherein the device communicates with a plurality of other ones of the devices.

50. The device as in claim 49, wherein the device communicates at any given time with only one of the other ones of the devices.

51. The device as in claim 1, wherein the device provides an active game with an associated display.

52. The device as in claim 51, wherein the active game is divided into phases comprising a discovery phase and an active play phase.

53. An electronic trading card apparatus comprising:
a processing subsystem having a processing logic section, memory for storing behavior rules, and a communications interface for interacting with other ones of the electronic trading card apparatus;
user input apparatus for use by a player;
wherein the processing subsystem provides programmed functionality which in combination form a persona, and responsive to the behavior rules, the user input apparatus and the communications interface;
a display providing for a display presentation to the player responsive to the persona formed by the processing subsystem.

54. The apparatus as in claim 53, further comprising the electronic trading card apparatus within a system comprising a plurality of other ones of electronic trading card apparatus;
wherein the player utilizes the user input apparatus to provide initial variable values for a predefined set of user adjustable values of variables, wherein thereafter the display provides a display presentation responsive to the communication interface coupling of interaction with the other ones of the electronic trading card apparatus.

55. The apparatus as in claim 54, wherein after the initial setting of values of the predefined set of values of variables, the system operates independent of further interaction by the player.

56. The apparatus as in claim 53, further characterized as being a part of a system comprised of a plurality of electronic trading card apparatus communicating interaction via the respective communications interfaces, wherein the operation of each of the respective electronic trading cards of the plurality are affected by communications interaction with other ones of the electronic trading card apparatus and with the player, wherein the display presentation of each of the respective electronic trading card apparatus is determined by the communications interaction of the system as a whole.

57. The apparatus as in claim 56, wherein the plurality of the totality of electronic trading card apparatus within the system form a community comprised of the player and the plurality of associated electronic trading card apparatus.

58. The apparatus as in claim 56, further characterized in that there are a plurality of communities, each comprising a respective one of the players and a respective plurality of associated electronic trading card apparatus, wherein all of the electronic trading card apparatus within a respective community communicate and interact consistently with respect to at least one of the stored behavior rules, so as to act consistently with respect to that one said behavior rule with respect to communication and interaction with the electronic trading card apparatus of other one of the communities within the system.

59. The apparatus as in claim 57, wherein the community is further comprised of at least one additional player, wherein the display presentation for the electronic trading card apparatus within the community is responsive to the interaction of the respective electronic trading card apparatus with all of the players and other ones of the electronic trading card apparatus.

60. The system as in claim 53, wherein the display is at least one of visual, audible, smell and other human perceivable stimuli.

61. The system as in claim 53, housed within an otherwise non-interactive apparatus.

62. A method of communicating amongst a network of networked computing entities to provide feedback to a user representative of a group social behavior comprising:
 (a) providing a uniform data structure for each said computing entity which defines group social behavior simulation; the data structure, comprising:
  (1) interaction rules and
  (2) initial conditions, wherein the interaction rules are comprised of fixed and variable elements, and wherein the initial conditions are comprised of fixed, variable and random elements;
 (b) modifying the variable elements of the interaction rules and the initial conditions responsive to interaction of the networked computing entities; and
 (c) exhibiting feedback of the group social behavior simulation to the user of at least one of the computing entities.

63. The method as in claim 62, further comprising:
modifying the variable elements of the interaction rules and initial conditions responsive to the user interaction with at least one of the computing entities.

* * * * *